(12) United States Patent
Sangle-Ferriere

(10) Patent No.: US 12,730,182 B2
(45) Date of Patent: Sep. 8, 2026

(54) METHOD FOR LOCATING A SOUND EVENT

(71) Applicant: MARBEUF CONSEIL ET RECHERCHE, Paris (FR)

(72) Inventor: Bruno Sangle-Ferriere, Paris (FR)

(73) Assignee: MARBEUF CONSEIL ET RECHERCHE, Paris (FR)

( * ) Notice: Subject to any disclaimer, the term of this patent is extended or adjusted under 35 U.S.C. 154(b) by 0 days.

(21) Appl. No.: 18/849,171

(22) PCT Filed: Jan. 11, 2024

(86) PCT No.: PCT/EP2024/050616
§ 371 (c)(1),
(2) Date: Sep. 20, 2024

(87) PCT Pub. No.: WO2024/149853
PCT Pub. Date: Jul. 18, 2024

(65) Prior Publication Data

US 2025/0347768 A1 Nov. 13, 2025

(30) Foreign Application Priority Data

Jan. 13, 2023 (FR) ....................................... 2300333

(51) Int. Cl.
*G01S 5/30* (2006.01)

(52) U.S. Cl.
CPC ..................................... *G01S 5/30* (2013.01)

(58) Field of Classification Search
None
See application file for complete search history.

(56) References Cited

U.S. PATENT DOCUMENTS 7,599,252 B2 * 10/2009 Showen .................... G01S 5/28 367/127
8,050,141 B1 * 11/2011 Carroll ...................... G01S 5/18 367/906
2010/0226210 A1 * 9/2010 Kordis ...................... G01S 5/22 367/127

FOREIGN PATENT DOCUMENTS

FR 2101708 A5 3/1972
FR 2923043 A1 5/2009
FR 3120134 A1 8/2022

OTHER PUBLICATIONS

Mahapatra et al., "Explosive sound source localization in indoor and outdoor environments using modified Levenberg Marquardt algorithm", Measurement Institute of Measurement and Control, vol. 187, dated Oct. 18, 2021 (19 pages).

(Continued)

*Primary Examiner* — James R Hulka
*Assistant Examiner* — Vikas Atmakuri
(74) *Attorney, Agent, or Firm* — Jason A. Smith; Shumaker, Loop & Kendrick, LLP

(57) ABSTRACT

The invention relates to a method for locating a sound event (S) by measuring the reception times at which at least three receivers (2, 3) receive signals representative of a sound wave emitted during the sound event (S), in particular receivers (2, 3) that have a known position or are fitted with a geolocation module configured to provide the position of the receiver (2, 3), the method comprising the steps that consist in: a) determining, for each receiver (2, 3), the reception time of a signal representative of the wave emitted during the sound event (S), referred to as "sound signal"; b) calculating, for at least two pairs of receivers (2, 3), a difference in the distances between the receivers (2, 3) of the pair and the sound event (S) based on the reception times of the sound signals; and c) determining the position of the (Continued)

sound event (S), by trilateration, on the basis of the one or more differences in the calculated distances and the position of the receivers (2, 3) at the corresponding reception times.

28 Claims, 2 Drawing Sheets

(56) References Cited

OTHER PUBLICATIONS

International Search Report (ISR) for PCT/EP2024/050616 mailed Feb. 19, 2024 (7 pages).

Kalle Astrom et al. "Extension of Time-Difference of Arrival Self Calibration Solutions Using Robust Multilateration" 2021 29th European Signal Processing Conference (EUSIPCO), EURASIP, Aug. 23, 2021, p. 870-874.

Hao Qin National University of Singapore: "Draft D2.3 Technical Report on quantum key distribution network (QKDN) protocols part 1: Quantum layer (output of 9th FG-QIT4N meeting); QIT4N-O-102" ITU-T Draft, Study Period 2021-2024, Focus Group QIT4N; Series QIT4N-O-102, International Telecommunication Union, Geneva, CH, vol. 17 (Aug. 17, 2021) pp. 1-42.

* cited by examiner

METHOD FOR LOCATING A SOUND EVENT

TECHNICAL FIELD

The present invention relates to the field of locating a sound event, such as a shot from a firearm or an explosion, based on the acoustic detection of such an event.

BACKGROUND

Numerous applications exist whereby precisely determining the location of a sound event is desirable.

For example, in the field of security, for several years there has been an increasing demand for the provision of means for locating shots from firearms, notably when confronted with attacks, armed conflicts, within the context of humanitarian interventions in unstable regions, or even during a hunting trip.

Systems have been created in an attempt to solve this problem, but they do not have the ability to be easily used by the general public on a mobile device.

U.S. Pat. No. 7,599,252 discloses a system for locating gunshots determining the position of the location based on information relating to the angle of arrival and the time of arrival of a sound wave on acoustic sensors.

U.S. Pat. No. 8,050,141 also discloses a system and a method for estimating the trajectory of a bullet based on the acoustics of the shock wave created when the bullet moves through the air.

However, these two solutions are complex and expensive to implement.

Therefore, a requirement exists to benefit from a system facilitating the location of a sound event without losing reliability in terms of the location. A requirement also exists for an easily transportable system for locating a sound event.

SUMMARY

The invention aims to address this requirement and achieves this aim by virtue of a method for locating a sound event by measuring reception times using at least three receivers for receiving signals representing a sound wave emitted during said sound event, notably receivers whose position is known or that are fitted with a geolocation module configured to provide the position of the receiver, the method comprising the following steps of:

a) determining, for each receiver, the reception time of a signal, called "sound signal", representing the wave emitted during the sound event;

b) computing, for at least two pairs of receivers, a difference in the distances between the receivers of said pair and the sound event based on the reception times of the sound signals;

c) determining the position of the sound event, by trilateration, based on the one or more differences in the computed distances and on the position of the receivers at the corresponding reception times.

By virtue of the method according to the invention, it is possible to simply and precisely obtain the location of a sound event.

A sound event can correspond, for example, to a shot from a firearm or to the impact of this shot, to an explosion, to a thunder clap, an alarm, a noise of an accident, or any other event generating a sound signal.

A firearm can correspond to a rifle, a shotgun, a machine gun, a howitzer, a mortar, a cannon, with the list being by no means limiting. The sound wave emitted by said weapon preferably corresponds to the muzzle wave.

The method can comprise displaying the position of the sound event on viewing means, for example, a screen, for example, of a computer, of a telephone or of an augmented reality headset.

The method can comprise storing the position of the sound event and the noises perceived by the receivers on a digital storage unit.

The method can further comprise storing the reception times at which the receivers receive the sound signal in the storage unit, notably with the position of the receivers at the reception times of the sound signal and can also comprise storing any sounds picked up by the receivers.

The method can comprise a step involving electronically signing the position of the sound event and/or the data used to compute the position of the sound event, notably the reception times of the sound signal and/or the position of the receivers at these reception times.

The storage unit can be a server remote from the receivers.

In some embodiments, determining the position in step c) is carried out by one of the receivers.

In some embodiments, determining the position in step c) is carried out by a server remote from the receivers.

Step a) can be carried out for at least one of the receivers by a remote server, with the sound signal being retransmitted by the receiver to said server.

Step b) can be carried out for at least one of the receivers by a remote server, with the reception time being retransmitted by the receiver to said server.

As an alternative embodiment, steps a) and/or b) are carried out by at least one of the receivers.

At least one receiver can be portable. The use of portable receivers allows the system to be deployed in various locations without involving significant logistics. In particular, the system can be used in a mobile manner, for example, with teams moving over an operating area, at a distance from one another.

At least one fixed receiver disposed at altitude, notably at the top of a building, such as a tower or a pylon, can be used to implement the steps of the method, with the position of the one or more fixed receivers being known.

The method can comprise consulting meteorological data in the vicinity of the receivers, for example, via a digital network. This can allow the location to be adjusted by taking into account the local propagation speeds of the sound and can thus improve the precision for locating the sound event, for example, using an iterative method.

The one or more receivers can be immobile at the time the sound signal is received. As an alternative embodiment, one or more receivers can be moving when the sound signal is received. In this case, the computation step b) is implemented in order to take into account the Doppler effect, notably using information relating to the direction and the norm of the speed of said receiver at the reception time. This can allow the recognition of the sound signal of the one or more moving receivers to be adapted and can then allow the signal representing the wave emitted during the sound event to be standardized. The information relating to the speed of the receiver, including the direction of movement of said receiver, is advantageously stored with the data that was used to determine the position of the sound event.

The method can comprise broadcasting an action to be carried out after step c) of determining the position of the sound event.

Said broadcasting can be carried out by transmitting a sound signal and/or by a display on a screen, notably a screen of one of the receivers.

The action to be carried out can be a message to seek shelter, notably broadcast by loudspeakers, for example, warning sirens, and/or a message to a set of mobile telephones, for example, by using a population warning and information network, for example, the FR-Alert network or a similar network.

The action to be carried out also can involve notifying emergency services, for example, the police, firefighters, civil defense, or even the army.

The action to be carried out can involve illuminating the identified position with a searchlight.

The action to be carried out can involve blank recording the identified position.

The action to be carried out can involve pointing a light beam, for example, that of a laser and/or a searchlight, toward the sound event S.

The action to be carried out can involve filming the location where the sound event occurred, for example, using a camera, preferably provided with a telephoto lens.

The action to be carried out can involve directing a reconnaissance drone to the location where the event occurred.

Of course, the method can comprise a plurality of broadcasting actions to be carried out after step c) of determining the position of the sound event.

The method also can be used to associate two sound events with one another such as, on the one hand, the muzzle noise of a firearm and, on the other hand, an impact noise of one or more projectiles, notably if the ballistics of the weapons that may have been used are known, even if the noise of the impact is too low to have been heard by more than one receiver.

When at least 4 receivers are used, preferably at least 6 receivers, the method can comprise a step of selecting receivers from among the receivers receiving the sound signal.

System for Detecting and Locating a Sound Event

A further aim of the invention is, according to another aspect thereof, independently or in combination with the above, a system for detecting and locating a sound event, comprising:

- at least three receivers, each arranged to receive at least one signal, called "sound signal", representing a sound wave emitted during the sound event,
- each receiver being fitted with at least one microphone, and comprising:
  - a location module that stores the position of the receiver or a geolocation module configured to provide the position of the receiver; and
  - a module selected from among:
    - a noise recognition module configured to recognize the sound signal and to determine the reception time at which said signal is received by the receiver; or
    - a retransmission module configured to transmit the signal representing sound to a remote noise recognition module in an instantaneous or deferred manner;
- processing means configured for:
  - receiving data, called "receiver data", associated with each receiver, comprising the sound signal or the reception time at which the sound signal is received by the receiver, and the position of said receiver at this reception time;
  - computing the date of the reception time of the sound event if it has not already been computed and then, for at least two pairs of receivers, computing the difference in distance between the event and each receiver of said pair based on the reception times at which the receivers receive the sound signal;
  - determining the position of the sound event by trilateration based on the computed differences in distance and on the position of the receivers.

A suitable noise recognition module is the OSSR "Orelia Sound Source Recognition" software marketed by Orelia and described in application FR 2923043.

The computers used to determine the reception time of the sound signal can have synchronized clocks or a common clock.

The system can be configured to certify the computed position of the sound event using an electronic signature.

The system can be configured to store, notably using processing means, the computed position, notably certified, of the sound event in a storage unit of the system and/or to transmit said position to a remote server so that this position is stored therein. The position of the computed sound event is preferably stored and/or transmitted with information relating to the receiver data used for the computation thereof.

The system can comprise viewing means configured for displaying the position of the sound event, with these viewing means notably comprising an augmented reality headset.

Geolocation Module

The geolocation modules can comprise or include a GNSS "Global Navigation Satellite System" satellite navigation system, in particular a GPS-type system. The location modules can comprise a GSM "Global System for Mobile" location system.

The geolocation module can comprise an indoor location system, notably a location system using Wi-Fi (Wireless Fidelity), UWB "Ultra-Wide Band", or EMF "Electromagnetic Field" or as described in patent FR 3120134 A1 entitled, "Method for geolocating a receiver".

The location module can comprise a location system using long waves with a frequency of less than 1 Ghz, as described in French patent application FR 2101708.

Receiver

At least one receiver, preferably all the receivers, can be selected from among a smart phone, a drone fitted with a microphone, a headset fitted with a microphone, a pair of smart glasses fitted with a microphone, a smart watch fitted with a microphone, a surveillance camera fitted with a microphone, an alarm unit base fitted with a microphone, a home automation unit fitted with a microphone, a connected vibration sensor, a voice assistant, a connected vehicle fitted with a microphone inside the passenger compartment, or any equipment comprising a microphone, with this list being by no means limiting. In particular, different receivers can be used, for example, a telephone and a drone or even several models of different telephones. The invention thus allows the number of potential receivers to be maximized without considerably increasing the cost of the system.

The system can comprise one or more fixed receivers disposed at altitude, notably at the top of a building, such as a tower or a pylon, with the position of the one or more fixed receivers being known.

The fixed receiver can be devoid of a geolocation system, with its position being known, notably because it is immobile.

The receivers can be a set of connected surveillance cameras installed in a city or a district for detecting noise disturbances or shots from firearms, notably in order to quickly locate an intervention site for law enforcement agencies.

The receivers can be a set made up of at least one mobile telephone and two receivers with known positions, notably for military or security applications.

The receivers can be a set made up of at least two drones and a mobile telephone for monitoring an area with an armed fugitive, for example.

The receivers can be a set of three microphones fitted with radio wave transmitters.

The receiver can be configured for storing the computed position, notably certified, of the sound event, in a storage unit of the receiver and/or for transmitting said position to a remote server so that this position is stored therein, with the computed position of the sound event preferably being stored and/or transmitted with information relating to the receiver data used for the computation thereof.

The receiver can comprise viewing means, notably a screen, arranged to display the position of the sound event or to depict it on a geographical map.

A further aim of the invention is, according to another aspect thereof, independently or in combination with the above, a receiver, notably for implementing the detection and location method described above, comprising:

- at least one microphone arranged to receive the signal representing a sound wave emitted during a sound event;
- a module selected from among:
  - a noise recognition module configured to recognize the signal representing the sound wave and to determine the reception time at which said signal is received by the receiver; or
  - a retransmission module configured to transmit the signal representing the sound wave to a remote noise recognition module in an instantaneous or deferred manner;
- a location module that stores the position of the receiver or a geolocation module configured to provide the position of the receiver at the reception time of the signal;
- the receiver being configured for
- i) transmitting data, called "receiver data", comprising the sound signal or the reception time at which the sound signal is received by the receiver, and the position of said receiver at this reception time;
- ii) receiving receiver data associated with other receivers and for computing the position of the sound event based on the received receiver data and on its own receiver data.

Computer Program

A further aim of the invention is, according to another aspect thereof, in combination with the above, a computer program product, comprising a code stored on a physical medium or downloadable from a server, comprising code instructions intended to be executed on computer equipment such as a server, a computer or a mobile telephone, with these instructions, when executed, leading to the implementation of the detection and location method described above, and in particular:

- retrieving data, called "receiver data", associated with each receiver, comprising the sound signal or the reception time at which the sound signal is received by the receiver, and the position of said receiver at this reception time;
- optionally, computing the reception time of the sound signal;
- computing, for at least two pairs of receivers, the differences in distances between the sound event and each receiver of said pair based on the reception times at which the receivers receive the sound signal;
- determining the position of the sound event by trilateration based on the computed differences in distances and on the positions of the receivers at the corresponding reception times; and
- optionally, displaying the position of the sound event on a screen, for example, of a computer, a telephone or an augmented reality headset;
- optionally computing the date of the sound event.

Storage Medium

A further aim of the invention is, according to another aspect thereof, in combination with the above, a computer-readable storage medium storing a computer program comprising program code instructions for executing the detection and location method described above.

Computer Server

A further aim of the invention is, according to another aspect thereof, in combination with the above, a computer server, for implementing the detection and location method described above, configured for

- receiving data, called "receiver data", comprising the sound signal or the reception time at which the sound signal is received by the receiver, and the position of said receiver at this reception time;
- computing, for each of the receivers, the date of the reception time of the sound event if it has not already been computed and then, for at least two pairs of receivers, computing the difference in distance between the sound event and each of the two receivers of said pair; and
- determining the position of the sound event, notably by trilateration, based on the computed distances.

Trilateration Computation

If the sound event has occurred in the plane formed by the three receivers, for example, if the sound event and the three receivers are on the ground, said sound event is located at the intersection of the two hyperbolas, whose receivers are the focal points and the difference in distance to the focal points is the difference between the reception times at which said receivers receive the sound coming from the event, multiplied by the speed of sound.

If the sound event is not located in the plane of the three receivers, it is preferable to have a fourth receiver located outside the plane formed by the first three receivers. The fourth receiver can be on a drone, or at the top of a post or even at the top of a building. The position of the sound event is then the intersection of three hyperbolic surfaces whose receivers are the focal points and the difference in distance to the focal points is the difference between the reception times at which said receivers receive the sound coming from the event, multiplied by the speed of sound.

This position can be computed, for example, using an orthogonal x, y, z reference frame, with the focal points of the first hyperbola being located on the right of the x axis, and the focal points of the second hyperbola being located in the xy plane. The points M(x, y, z) of the first one of these two hyperbolic surfaces then verifies an equation:

$$x^2/a^2 - (y^2 + z^2)/b^2 = 1$$

A parameter t can be used such that $$t = x/a - y/b \text{ therefore: } t*(x/a + y/b) = 1 + z^2/b^2 \text{ therefore } x/a + y/b = (1 + z^2/b^2)/t$$

and then $$x/a = 1/2\left[(1 + z^2/b^2)/t + t\right]$$

$$y/b = 1/2\left[(1 + z^2/b^2)/t - t\right]$$

The second hyperbolic surface is the result of the rotation about an axis, in a direction parallel to z and perpendicular to the xy plane, of another hyperbolic surface rotating about the x axis and having an equation in the following form:

$$\alpha x^2 + \beta^2 + \gamma xy + \varepsilon z^2 = 1$$

This equation allows one or more values of t to be found for each z:

$$\alpha\left(a*1/2\left(t + (1 + z^2/b^2)/t\right)\right)^2 + \beta*\left(b\,1/2\left(-t + (1 + z^2/b^2)/t\right)\right)^2 + \gamma ab*\left(t^2 - (1 + z^2/b^2)2/t^2\right)/4 + \varepsilon z^2 = 1$$

$$\alpha\left(a*1/2\left(t^2 + (1 + z^2/b^2)\right)\right)^2 + \beta*\left(b\,1/2\left(-t^2 + (1 + z^2/b^2)\right)\right)^2 + \gamma ab*\left(t^4 - (1 + z^2/b^2)\right)/4 + \varepsilon z^2 t^2 = t^2$$

in other words:

$$\alpha\left(a*1/2\left(t^4 + (1 + z^2/b^2)^2 + 2*(1 + z^2/b^2)*t^2\right) + \beta*b\,1/2*\left(t^4 + (1 + z^2/b^2)^2 - 2*(1 + z^2/b^2)*t^2\right) + \gamma ab*\left(t^4 - (1 + z^2/b^2)\right)/4 + \varepsilon z^2 t^2 = t^2$$

in other words:

$$t^4*\left(\alpha a/2 + \beta*b/2 + \gamma ab/4\right) + t^2*\left(\alpha a(1 + z^2/b^2) - \beta b(1 + z^2/b^2) + \varepsilon z^2 - 1\right) + \left(\alpha a/2*(1 + z^2/b^2)^2 + \beta*b/2*(1 + z^2/b^2)2 - \gamma ab/4*(1 + z^2/b^2)\right) = 0$$

Which is an equation that allows $t^2$ to be provided as a function of z and therefore x and y as a function of z, and that can have up to two solutions for $t^2$.

The third hyperbolic surface is a second-order x-, y- and z-equation, which is then converted into four t-equations. The Cartesian equation of the third hyperbolic surface can therefore generate four t-equations, the one or more solutions to which are found using digital techniques, notably by dichotomy.

The possibility of finding eight different values for a single value of z reflects the fact that the quadratic equation of each of the hyperbolas does not take into account the sign of the difference in distances relative to the focal points. A verification of each solution, taking into account the sign of the difference d1–d2 between the distances to the emitters, allows the unique intersection of the three surfaces to be found.

BRIEF DESCRIPTION OF THE DRAWINGS

The invention will be better understood upon reading the following detailed description of a non-limiting embodiment thereof, and with reference to the appended drawings, in which.

DETAILED DESCRIPTION

Throughout the remainder of the description, identical elements or identical functions use the same reference sign. For the sake of the conciseness of the present description, they are not described with reference to each of the figures, with only the differences between the embodiments being described.

In the figures, the actual proportions have not always been followed, for the sake of clarity.

Location System

Figure 1:
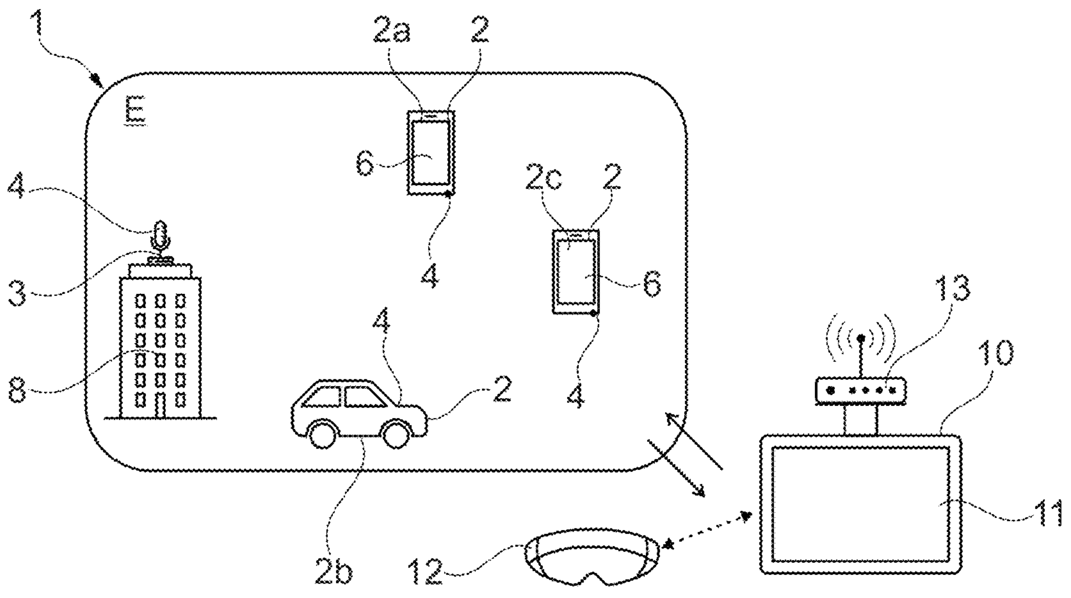
FIG. 1 schematically illustrates an example of a system according to the invention.

FIG. 1 illustrates an embodiment of a system 1 for detecting and locating a sound event in a space E according to the invention.

The space E is open.

The system 1 comprises three mobile receivers 2: 2*a*, 2*b* and 2*c* and a fixed receiver 3, with each receiver being fitted with a microphone 4. They are each designed to receive at least one signal, called "sound signal", representing a sound wave emitted during the sound event S.

Two of the mobile receivers 2 are mobile telephones 2*a* and 2*c* of the "smart phone" type including a dedicated application for locating a sound event. For example, the telephones 2*a* and 2*c* are carried by two operators.

The telephones 2*a* and 2*c* further comprise a digital screen 6 for displaying information.

The telephones 2*a* and 2*c* comprise a noise recognition module configured to recognize a sound signal and to determine the reception time at which said signal is received by the receiver, for example, the OSSR "Orelia Sound Source Recognition" software marketed by Orelia and described in application FR 2923043.

The other portable receiver 2*b* is a device present in a car, for example, a vehicle control panel provided with a microphone.

The three mobile receivers 2 comprise a geolocation module configured to provide their own position, in this example a GNSS satellite navigation system.

The fixed receiver 3 is disposed at altitude at the top of a tower 8. The location of the microphone 4 of the additional receiver 3 is known, with the fixed receiver 3 being devoid of a geolocation system. Alternatively, the fixed receiver 3 also comprises a geolocation module.

The system 1 also comprises a first processing means, in this example a server 10.

As will be described hereafter, the server 10 comprises a storage medium comprising a computer program, and is configured for:

receiving data, called "receiver data", associated with each receiver 2*a*, 2*b*, 2*c*, 3, comprising the sound signal or the reception time at which the sound signal is received by the receivers 2*a*, 2*b*, 2*c* and 3 and the position of the receivers at this reception time;

computing, for at least three pairs of receivers each comprising two of the four receivers 2*a*, 2*b*, 2*c*, 3, the difference in distance between the event and each of the two receivers of said pair, with this distance being computed based on the reception times at which the sound signal is received by each of the receivers and on the sound propagation speed;

determining the position of the sound event by trilateration based on the computed differences in distances and on the position of the receivers 2*a*, 2*b*, 2*c*, 3.

As illustrated, the server 10 comprises a screen 11 notably allowing the determined position of the sound event to be displayed. This screen is also used to browse a log of sound events in order to display the positions and times thereof.

For example, the system 1 comprises an augmented reality headset 12 connected to the server 10 by a wireless link and for displaying the determined position of the sound event.

This headset 12 can be worn, for example, by an operator in the field in order to quickly locate the sound event.

The server 10 comprises, for example, a communication device 13 for exchanging information with the various receivers 2, 3 and with the headset 12.

In this example, the three portable receivers 2 and the fixed receiver 3 are configured to transmit the receiver data to the server 10.

For example, the data transmissions are carried out wirelessly via telephone or 3G, 4G or 5G electromagnetic communications to the server 10, while a Wi-Fi transmission mode allows the devices to communicate via a Mesh network in the event of the failure of the 3G, 4G and 5G telephone networks.

In addition, the telephone 2*a* in this case is configured to receive receiver data 2*b* associated with the car, the telephone 2*c*, and the fixed receiver 3 and to compute the position of the sound event S based on data received from said receiver and its own receiver data.

The telephone 2*a* is configured, for example, to store the position of the sound event S, once computed, in a storage unit of the receiver, for example, an SD card, with the computed position of the sound event S preferably being stored with information relating to the data of the receivers used for the computation thereof.

For example, the portable receivers 2 and the server 10 comprise computers, with synchronized clocks, used to determine the reception time of the sound signal. The date of the reception time of the sound signal of the fixed receiver 3 is that computed either by the server 10 or by the telephone 2*a*.

The portable receivers 2 and the fixed receiver 3 are advantageously configured to electronically sign the receiver data in order to allow the position of the sound event to be certified.

Location Method

Figure 2:
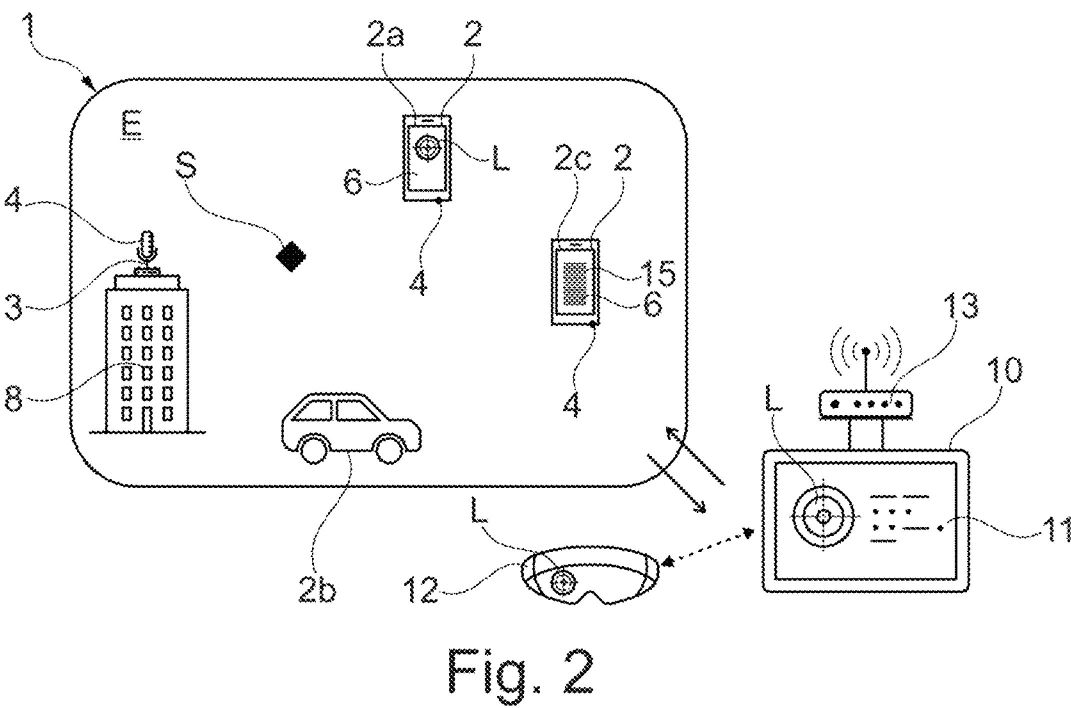
FIG. 2 illustrates a method for locating a sound event according to the invention.

FIG. 2 illustrates an example of a method according to the invention for locating a sound event S using the system 1 described above.

The sound event S can correspond, for example, to a shot from a firearm or to the impact of this shot, to an explosion, an accident, to a thunder clap, an alarm, or to any other sound event generating a sound signal.

In a first step, the portable receivers 2 and the additional receiver 3 will detect a sound signal representing the sound event S.

The reception time of the sound signal is directly determined by the computer of the portable receivers 2. Each portable receiver 2 will then transmit its position at the reception time and the reception time of the sound signal to the server 10.

The fixed receiver 3 for its part continuously sends its sound signal to the server 10. Thus, the reception time at which the sound signal is received by the fixed receiver 3 is determined by the computer of the server 10. The position of the fixed receiver 3 is also known to the server 10.

For example, the telephones 2*a* and 2*c* are located at an altitude Z1.

The car 2*b* is at an altitude Z2 that is slightly higher than the altitude Z1.

The receiver 3 is at an altitude Z3 that is much higher than the altitude Z2, for example, three or 10 times higher.

The sound event S is positioned at an altitude Zs.

Next, the server 10 computes, for at least three pairs of receivers 2 or 3, and preferably for at least 4 pairs of receivers, namely, for example, the telephone 2*a*/car 2*b* pair, the telephone 2*a*/fixed receiver 3 pair, the telephone 2*a*/telephone 2*c* pair, the car 2*b*/fixed receiver 3 pair, the differences in distances between the sound event S and each receiver of said pair based on the reception dates at which the sound signal is received by the receivers.

These differences in distances are computed, for example, by multiplying the speed of sound with the difference between the reception times of the receivers of said pair.

Next, the position of the sound event S is determined by trilateration based on the computed differences in distances and on the positions of the receivers at the corresponding reception times.

As indicated above, the position of the sound event S also can be determined by the telephone 2*a*.

Once the position of the sound event S is determined, location information L is displayed on the screen 11 of the server 10 and said location is depicted on the visor of the headset 12 and on the screen 6 of the telephone 2*a*.

The set of data, namely, the position of the sound event S and the receiver data, then can be stored in an internal memory of the server 10 and the telephone 2*a*.

During the reception of the sound signal, the portable receivers 2 can be fixed or mobile.

For example, the car carrying the device 2*b* can be moving during the reception of the sound signal. In this case, said car transmits its speed and its direction with the receiver data, in order to take into account the Doppler effect when identifying the noise.

It is worthwhile adjusting the precision involved in determining the geolocation by taking into account the meteorological or microclimate conditions in the vicinity of the receivers 2, 3, with the temperature and the pressure notably influencing the speed of sound.

An optimization also can be implemented using an iterative method taking into account the meteorological conditions around the receivers 2 and 3 and in the vicinity of the iterations of the position computed for the event S, until a convergence is obtained. Notably, this convergence can be implemented until a difference in distance between two successive iterations is obtained that is less than a desired tolerance, for example, less than 10 cm, or even less than 5 cm.

The telephone 2*c* receiving the geolocation of the sound event can, while indicating the location of the event on a map or a 3D depiction of the environment, broadcast an audible or visual warning indicating a danger.

A laser and/or a searchlight disposed on the vehicle carrying the device 2*b* can be controlled so as to point their light beams toward the sound event S. Similarly, a camera, preferably provided with a telephoto lens, for example, disposed on a vehicle, can be controlled to film the location where the sound event occurred.

Figure 3:
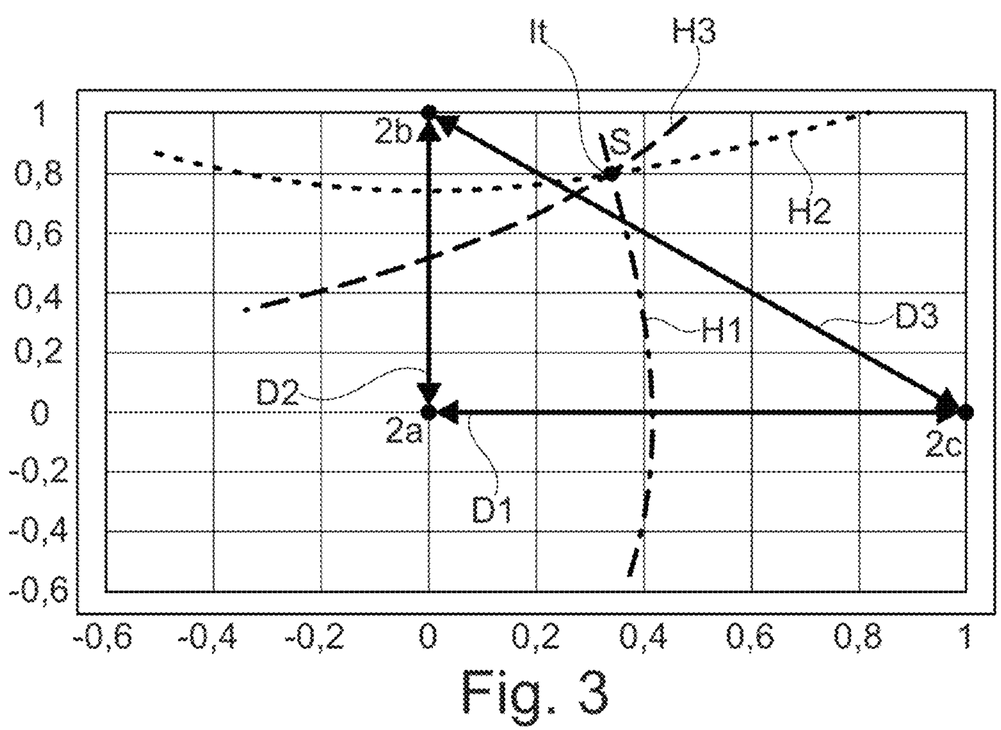
FIG. 3 illustrates an example of two-dimensional trilateration computation.

An example of trilateration computation is illustrated in FIG. 3.

In this example, the computation is undertaken in two dimensions, three receivers 2*a*, 2*b* and 2*c* are used, with the system then allowing an event S to be located that occurred in the plane in which the three receivers are located.

Alternatively, all the mobile receivers 2 are located on drones preferably flying at different altitudes, for example, 15 m, 20 m, 25 m, 26 m and 100 m.

The sound event S occurred in the plane formed by the three receivers 2*a*, 2*b* and 2*c* whose positions are known at the time of reception of the sound signal, notably by virtue of geolocation modules.

In order to determine the position of the event S, two hyperbolas are determined.

The first hyperbola H1 is determined using the receivers 2*a* and 2*c* as focal points and based on the difference in distance from the event S to the focal points, which is the difference between the dates said receivers receive the sound coming from the event S, multiplied by the speed of sound.

The second hyperbola H2 is determined using the receivers 2*a* and 2*b* as focal points, based on the difference in distance from the event S to the focal points, which is the difference between the dates said receivers receive the sound coming from the event S, multiplied by the speed of sound, and based on the distance D2 between the receivers 2*a* and 2*b*.

The sound event S is then located at the intersections It of the two hyperbolas H1 and H2.

In order to refine the position, a third hyperbola H3 can be determined using the receivers 2*b* and 2*c* as focal points, based on the difference in distance from the event S to the focal points, which is the difference between the dates said receivers receive the sound coming from the event S, multiplied by the speed of sound, and based on the distance D3 between the receivers 2*b* and 2*c*.

For determining three-dimensionally, the computation is similar, using hyperbolic surfaces and an additional receiver.

Further Location System

Figure 4:
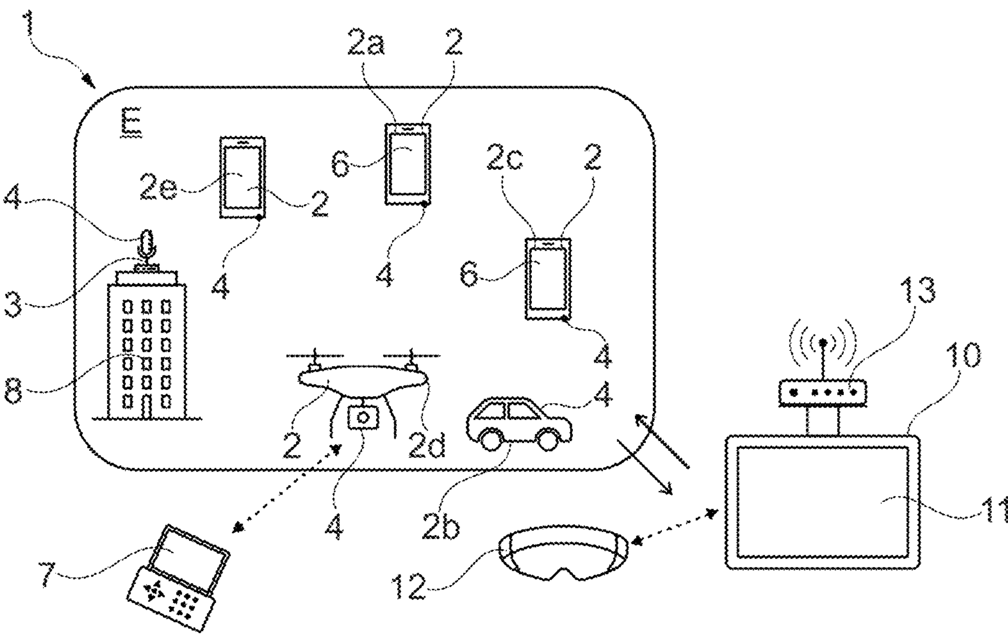
FIG. 4 schematically illustrates another example of a system according to the invention.

FIG. 4 shows another example of a system 1 according to the invention that comprises five mobile receivers 2 and a fixed receiver 3.

Compared with the system 1 of FIG. 1, the second system 1 also comprises a flying drone 2*d* and a third mobile telephone 2*e*.

The telephone 2*e* operates similar to the telephones 2*a* and 2*c*, for example, it is a different model.

The drone 2*b* is, for example, remotely controlled by an operator or by software with a remote control 7. The drone 2*d* comprises a transmission module configured to transmit the sound signal to a noise recognition module present in the remote control 7 in an instantaneous or deferred manner.

The noise recognition module of the remote control 7 of the drone 2*d* is configured to recognize a sound signal and to determine the reception time at which said signal is received by the receiver, for example, OSSR "Orelia Sound Source Recognition" software marketed by Orelia and described in application FR 2923043.

The drone 2*d* can be configured to fly at a given altitude, for example, 100 m and a given distance away, for example, in line with a remote point by a given distance, for example, 200 m from a straight line passing through the fixed receiver 3 and one of the mobile telephones 2*a* and 2*c*. Alternatively, the drone 2*d* preferably remains controlled so as to remain close to the barycenter of the emitters 2*a*, 2*c*, 2*e* and 3 located on the ground.

In order to locate a sound event S using the second system, the location method used is similar to the previous one, with the difference being that more receivers 2 and 3 are used, which can improve the precision of the location of the sound event S.

The telephones 2*a*, 2*c* and 2*e* are located at the same altitude Z1.

The car 2*b* is at an altitude Z2 that is slightly higher than the altitude Z1.

The receiver 3 is at an altitude Z3 that is greater than the altitude Z2, for example, three times higher.

The drone 2*d* flies at an altitude Z4 that is higher than the altitude Z3, for example, an altitude of 100 m.

The invention is not limited to the example described above.

In particular, the number of portable receivers 2 can be different, for example, it can range between 2 and 10.

When the system comprises a large number of receivers 2 and 3, for example, at least 4, notably at least 6, the method can comprise a step of selecting receivers 2 and 3 from among this set receiving the sound signal.

For example, for each quadruplet of receivers, the receiver that delimits the largest space is determined by computing the volume delimited by each quadruplet, then a first geolocation of the noise is determined using the reception times at which this quadruplet of receivers receives the sound signal.

During a second phase, if the first location of the noise is successful, a fifth receiver can be used from among the receivers closest to the sound event in order to refine the position, then yet another receiver can be used, until the position is precise enough or no longer improves. In the event of failure, i.e., if it is impossible to find an intersection, for example, if the sound signal received by a receiver is derived from a noise reflected on a wall, another smaller quadruplet can be used.

The systems 1 can be devoid of an additional receiver 3.

The system can be devoid of a portable receiver.

The system can comprise at least two portable receivers.

The invention claimed is:

1. A method for locating a sound event (S) by measuring the reception times at which at least four receivers receive signals representing a sound wave emitted during said sound event (S), with the position of the receivers being known or the receivers being fitted with a geolocation module configured to provide the position of the receiver, the method comprising the following steps of:

a) determining, for each receiver, the reception time of a signal, called "sound signal", representing the wave emitted during the sound event (S);

b) computing, for at least two pairs of receivers, a difference in the distances between the receivers of said pair and the sound event (S) based on the reception times of the sound signals;

c) determining the position of the sound event (S), by trilateration, based on the one or more differences in the computed distances and on the position of the receivers at the corresponding reception times, with the position of the sound event being the intersection of three hyperbolic surfaces whose receivers are the focal points and the differences in distance to the focal points are determined based on the reception times of the sound signals, with the computation being carried out using an orthogonal x, y, z reference frame, with the focal points of the first hyperbola being located on the right of the x axis, and the focal points of the second hyperbola being located in the xy plane, with the points M(x, y, z) of the first one of these two hyperbolic surfaces verifying an equation:

$$x^2/a^2 - (y^2 + z^2)/b^2 = 1$$

using a parameter t, such that $$t = x/a - y/b$$

$$\text{therefore: } t*(x/a + y/b) = 1 + z^2/b^2$$

$$\text{therefore } x/a + y/b = (1 + z^2/b^2)/t \text{ and}$$

$$x/a = 1/2[(1 + z^2/b^2)/t + t]$$

$$y/b = 1/2[(1 + z^2/b^2)/t - t]$$

the second hyperbolic surface being the result of the rotation about an axis, in a direction parallel to z and perpendicular to the xy plane, of another hyperbolic surface rotating about the x axis and having an equation in the following form:

$$\alpha x^2 + \beta y^2 + \gamma xy + \varepsilon z^2 = 1$$

with this equation allowing one or more values of t to be found for each z:

$$\alpha(a*1/2\,(t + (1 + z^2/b^2)/t))^2 + \beta*(b\,1/2\,(-t + (1 + z^2/b^2)/t))^2 + \gamma ab*(t^2 - (1 + z^2/b^2)2/t^2)/4 + \varepsilon z^2 = 1$$

$$\alpha(a*1/2\,(t^2 + (1 + z^2/b^2))^2 + \beta*(b\,1/2\,(-t^2 + (1 + z^2/b^2)))^2 + \gamma ab*(t4 - (1 + z^2/b^2))/4 + \varepsilon z^2 t^2 = t^2$$

in other words:

$$\alpha(a*1/2\,(t4 + (1 + z^2/b^2)^2 + 2*(1 + z^2/b^2)*t^2) + \beta*b\,1/2*(t4 + (1 + z^2/b^2)^2 - 2*(1 + z^2/b^2)*t^2) + \gamma ab*(t4 - (1 + z^2/b^2))/4 + \varepsilon z2t^2 = t^2$$

in other words:

$$t4*(\alpha a/2 + \beta*b/2 + \gamma ab/4) + t^2*(\alpha a(1 + z^2/b^2) - \beta b(1 + z^2/b^2) + \varepsilon z^2 - 1) + (\alpha a/2*(1 + z^2/b^2)^2 + \beta*b/2*(1 + z^2/b^2)2 - \gamma ab/4*(1 + z^2/b^2) = 0$$

providing $t^2$ as a function of z, as well as x and y as a function of z, having up to two solutions for $t^2$;

the third hyperbolic surface being a second-order x-, y- and z-equation, which is then converted into four t-equations, with the Cartesian equation of the third hyperbolic surface generating four t-equations, the one or more solutions to which are found using digital techniques, notably by dichotomy.

2. The location method as claimed in claim 1, wherein at least one receiver, is selected from among a smart phone, a drone fitted with a microphone, a headset fitted with a microphone, a pair of smart glasses fitted with a microphone, a smart watch fitted with a microphone, a surveillance camera fitted with a microphone, an alarm unit base fitted with a microphone, a home automation unit fitted with a microphone, a connected vibration sensor, a voice assistant, a connected vehicle fitted with a microphone inside the passenger compartment, or any equipment comprising a microphone.

3. The location method as claimed in claim 1, comprising displaying the position of the sound event (S) on viewing means, for example, a screen, for example, of a computer, of a telephone or of an augmented reality headset.

4. The location method as claimed in claim 1, comprising broadcasting an action to be carried out after step c) of determining the position of the sound event (S).

5. The method as claimed in claim 1, comprising storing the position of the sound event (S) and the noises perceived by the receivers on a digital storage unit.

6. The method as claimed in claim 1, further comprising storing the reception times at which the receivers receive the sound signal in the storage unit, notably with the position of the receivers at the reception times of the sound signal.

7. The method as claimed in claim 5, comprising a step involving electronically signing the position of the sound event (S) and/or the data used to compute the position of the sound event (S), notably the reception times of the sound signal and/or the position of the receivers at these reception times.

8. The method as claimed in claim 5, wherein the storage unit is a server (10) remote from the receivers.

9. The method as claimed in claim 1, wherein determining the position in step c) is carried out by one of the receivers.

10. The method as claimed in claim 1, wherein determining the position in step c) is carried out by a server remote from the receivers.

11. The method as claimed in claim 1, wherein step a) is carried out for at least one of the receivers by a remote server, with the sound signal being retransmitted by the receiver to said server.

12. The method as claimed in claim 1, wherein step b) is carried out for at least one of the receivers by a remote server, with the reception time being retransmitted by the receiver to said server.

13. The method as claimed in claim 1, wherein steps a) and/or b) are carried out by at least one of the receivers.

14. The method as claimed in claim 1, wherein at least 4 receivers are used, preferably at least 6 receivers, with the method comprising a step of selecting receivers from among the receivers receiving the sound signal.

15. A system for detecting and locating a sound event (S), comprising:

at least four receivers, each arranged to receive at least one signal, called "sound signal", representing a sound wave emitted during the sound event (S); each receiver being fitted with at least one microphone, and comprising:

a location module that stores the position of the receiver or a geolocation module configured to provide the position of the receiver; and a module selected from among:

a noise recognition module configured to recognize the sound signal and to determine the reception time at which said signal is received by the receiver; or a retransmission module configured to transmit the signal representing sound to a remote noise recognition module in an instantaneous or deferred manner;

processing means configured for:

receiving data, called "receiver data", associated with each receiver, comprising the sound signal or the reception time at which the sound signal is received by the receiver, and the position of said receiver at this reception time;

computing the date of the reception time of the sound event if it has not already been computed and then, for at least two pairs of receivers, computing the difference in distance between the sound event (S) and each receiver of said pair based on the reception times at which the receivers receive the sound signal;

determining the position of the sound event (S) by trilateration based on the computed differences in distance and on the position of the receivers, with the position of the sound event being the intersection of three hyperbolic surfaces whose receivers are the focal points and the differences in distance to the focal points are determined based on the reception times of the sound signals, with the computation being carried out using an orthogonal x, y, z reference frame, with the focal points of the first hyperbola being located on the right of the x axis, and the focal points of the second hyperbola being located in the xy plane, with the points M(x, y, z) of the first one of these two hyperbolic surfaces verifying an equation:

$$x^2/a^2-(y^2+z^2)/b^2=1$$

using a parameter t, such that $$t=x/a-y/b$$

$$\text{therefore: } t*(x/a+y/b)=1+z^2/b^2$$

$$\text{therefore } x/a+y/b=(1+z^2/b^2)/t \text{ and}$$

$$x/a=1/2[(1+z^2/b^2)/t+t]$$

$$y/b=1/2[(1+z^2/b^2)/t-t]$$

the second hyperbolic surface being the result of the rotation about an axis, in a direction parallel to z and perpendicular to the xy plane, of another hyperbolic surface rotating about the x axis and having an equation in the following form:

$$\alpha x^2+\beta y^2+\gamma xy+\varepsilon z^2=1$$

with this equation allowing one or more values of t to be found for each z:

$$\alpha\left(a*1/2\left(t+\left(1+z^2/b^2\right)/t\right)\right)^2+\beta*\left(b\,1/2\left(-t+\left(1+z^2/b^2\right)/t\right)\right)^2+\gamma ab*\left(t^2-\left(1+z^2/b^2\right)2/t^2\right)/4+\varepsilon z^2=1$$

$$\alpha\left(a*1/2\left(t^2+\left(1+z^2/b^2\right)\right)^2+\beta*\left(b\,1/2\left(-t^2+\left(1+z^2/b^2\right)\right)\right)^2+\gamma ab*\left(t4-\left(1+z^2/b^2\right)\right)/4+\varepsilon z^2t^2=t^2$$

in other words:

$$\alpha\left(a*1/2\left(t4+\left(1+z^2/b^2\right)^2+2*\left(1+z^2/b^2\right)*t^2\right)+\beta*b\,1/2*\left(t4+\left(1+z^2/b^2\right)^2-2*\left(1+z^2/b^2\right)*t^2\right)+\gamma ab*\left(t4-\left(1+z^2/b^2\right)\right)/4+\varepsilon z2t^2=t^2$$

in other words:

$$t4*\left(\alpha a/2+\beta*b/2+\gamma ab/4\right)+t^2*\left(\alpha a\left(1+z^2/b^2\right)-\beta b\left(1+z^2/b^2\right)+\varepsilon z^2-1\right)+\left(\alpha a/2*\left(1+z^2/b^2\right)^2+\beta*b/2*\left(1+z^2/b^2\right)2-\gamma ab/4*\left(1+z^2/b^2\right)=0\right.$$

providing $t^2$ as a function of z, as well as x and y as a function of z, having up to two solutions for $t^2$;

the third hyperbolic surface being a second-order x-, y- and z-equation, which is then converted into four t-equations, with the Cartesian equation of the third hyperbolic surface generating four t-equations, the one or more solutions to which are found using digital techniques, notably by dichotomy.

16. The system of claim 15, with at least one receiver being selected from among a smart phone, a drone fitted with a microphone, a headset fitted with a microphone, a pair of smart glasses fitted with a microphone, a smart watch fitted with a microphone, a surveillance camera fitted with a microphone, an alarm unit base fitted with a microphone, a home automation unit fitted with a microphone, a connected vibration sensor, a voice assistant, a connected vehicle fitted with a microphone inside the passenger compartment, or any equipment comprising a microphone.

17. The system of claim 15, comprising one or more fixed receivers disposed at altitude, notably at the top of a building, such as a tower or a pylon, with the position of the one or more fixed receivers being known.

18. The system of claim 17, wherein the fixed receiver is devoid of a geolocation system, with its position being known.

19. The system of claim 15, wherein the computers used to determine the reception time of the sound signal have synchronized clocks or a common clock.

20. The system of claim 15, being configured to certify the computed position of the sound event (S) using an electronic signature.

21. The system of claim 15, being configured for storing, notably using processing means, the computed position, notably certified, of the sound event (S) in a storage unit of the system and/or for transmitting said position to a remote server so that this position is stored therein, with the computed position of the sound event (S) preferably being stored and/or transmitted with information relating to the receiver data used for the computation thereof.

22. The system of claim 15, comprising viewing means configured for displaying the position of the sound event (S), with these viewing means.

23. A receiver for implementing the detection and location method as claimed in claim 1, comprising:

at least one microphone arranged to receive the signal representing a sound wave emitted during a sound event (S);

a module selected from among:

a noise recognition module configured to recognize the signal representing the sound wave and to determine the reception time at which said signal is received by the receiver; or a retransmission module configured to transmit the signal representing the sound wave to a remote noise recognition module in an instantaneous or deferred manner;

a location module that stores the position of the receiver or a geolocation module configured to provide the position of the receiver at the reception time of the signal;

the receiver-being configured for:

i) transmitting data, called "receiver data", comprising the sound signal or the reception time at which the sound signal is received by the receiver, and the position of said receiver at this reception time;

ii) receiving receiver data associated with other receivers and for computing the position of the sound event (S) based on the received receiver data and on its own receiver data.

24. The receiver as claimed in claim 23, configured for storing the computed position, notably certified, of the sound event (S) in a storage unit of the receiver and/or for transmitting said position to a remote server so that this position is stored therein, with the computed position of the sound event (S) preferably being stored and/or transmitted with information relating to the receiver data used for the computation thereof.

25. The receiver of claim 23, comprising viewing means arranged to display the position of the sound event (S) or to depict it on a geographical map.

26. A computer program product, comprising a code stored on a physical medium er downloadable from a server, comprising code instructions intended to be executed on computer equipment such as a server, a computer or a mobile telephone, with these instructions, when executed, leading to the implementation of the detection and location method as claimed in claim 1, and comprising the following steps:

retrieving data, called "receiver data", associated with each receiver, comprising the sound signal or the reception time at which the sound signal is received by the receiver, and the position of said receiver at this reception time;

optionally, computing the reception time of the sound signal;

computing, for at least two pairs of receivers, the differences in distances between the sound event (S) and each receiver of said pair based on the reception times at which the receivers-receive the sound signal;

determining the position of the sound event (S) by trilateration based on the computed differences in distances and on the position of the receivers at the corresponding reception times; and optionally, displaying the position of the sound event (S) on a screen.

27. A non-transitory computer-readable storage medium storing a computer program comprising program code instructions for executing the detection and location method claim 1.

28. A computer server for implementing the detection and location method of claim 1, configured for:

receiving data, called "receiver data", from each receiver comprising the sound signal or the reception time at which the sound signal is received by the receiver, and the position of said receiver at this reception time;

computing, for each of the receivers, the date of the reception time of the sound event (S) if it has not already been computed and then, for at least two pairs of receivers, computing the difference in distance between the sound event (S) and each of the two receivers of said pair; and determining the position of the sound event (S) by trilateration based on the computed distances.

* * * * *